Figure 1:
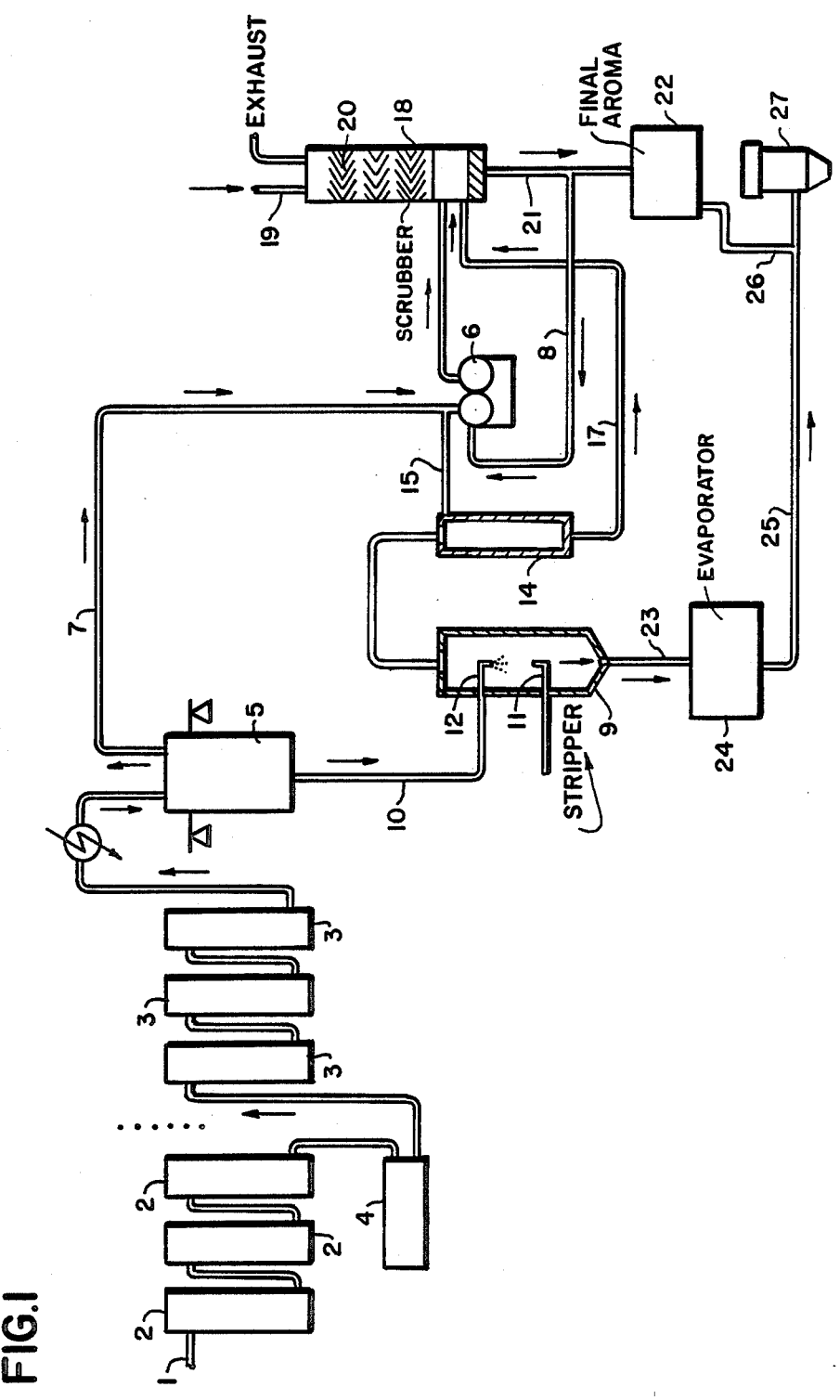

United States Patent [19]
Jones et al.

[11] Patent Number: 4,794,010
[45] Date of Patent: Dec. 27, 1988

[54] PROCESS FOR THE PREPARATION OF SOLUBLE COFFEE

[75] Inventors: Gary V. Jones, Bremen, Fed. Rep. of Germany; Stuart A. Stein, Hoboken, N.J.; David Kaganoff, New York, N.Y.

[73] Assignee: General Foods Corporation, White Plains, N.Y.

[21] Appl. No.: 151,354

[22] Filed: Feb. 2, 1988

[51] Int. Cl.4 .......................... A23F 5/24; A23F 5/50
[52] U.S. Cl. ..................................... 426/387; 426/594
[58] Field of Search .................... 426/386, 387, 594

[56] References Cited

U.S. PATENT DOCUMENTS

| | | | |
|---|---|---|---|
| 3,248,233 | 4/1966 | Brent et al. | 426/387 X |
| 3,345,182 | 10/1967 | Huste et al. | 426/386 |
| 4,379,172 | 4/1983 | Liu | 426/386 |
| 4,474,820 | 10/1984 | Hawes et al. | 426/387 |

Primary Examiner—Joseph Golian
Attorney, Agent, or Firm—Daniel J. Donovan; Thomas R. Savoie

[57] ABSTRACT

This invention is designed to obtain desirable flavor and aroma volatiles during processing of an aqueous coffee extract obtained from roasted and ground coffee. The overall process of preparing soluble coffee by spray drying a concentrated aqueous extract is improved by employing a stripper to remove up to 20% of the extract prior to concentration and to recover non-condensible and condensible aromas in cold water using an absorber having 4–48 plates and a 0.1/1 to 30/1 L/V ratio prior to reintroducing the absorbed aromas into the concentrated coffee extract and spray drying it to give an aromatized dry soluble coffee.

2 Claims, 2 Drawing Sheets

PROCESS FOR THE PREPARATION OF SOLUBLE COFFEE

TECHNICAL FIELD

This invention relates to a process for the preparation of an aromatic soluble coffee by spray drying a concentrated aqueous coffee extract having a preponderance of light coffee aromas obtained from the coffee process.

Work done by Huste et al., U.S. Pat. No. 3,345,182, indicates that volatile retention across spray drying is improved with higher solids concentration of aqueous coffee extract. However, it is more economical to operate the coffee percolators using a high drawoff factor which gives high soluble yield but a low solids concentration in the extract. Therefore, a more effective method of concentrating this dilute extract is desirable. However, capturing and retaining volatile coffee flavor and aroma compounds normally lost during such processing is also essential.

The present invention may be used as an alternative of the process disclosed in Hawes et al., U.S. Pat. No. 4,474,820. According to the process as described in the patent, a cold coffee xxtract is used to absorb highly volatile coffee flavor and aroma compounds in an absorption column. The extract is then added back to the concentrate and subsequently is spray dried.

U.S. Pat. No. 4,379,172, issued Apr. 5, 1983 to Liu, describes the steam stripping collection of aroma at low temperature and concentration of coffee extract.

U.S. Pat. No. 3,248,233 describes employing a vacuum pump to capture aroma.

This invention relates to the use of an absorption column for capturing and retaining volatile coffee flavor and aroma compounds obtained during processing and concentration of dilute coffee extract by absorption of the aroma compounds into cold water using a scrubber containing structured packing to provide from 8 to 24 stages of separation. In addition, the liquid to gas ratio employed in the scrubber can be maintained at 0.1/1 to 3/1, but preferably is maintained at a ratio of 8/1 to 16/1, preferably 10/1 to 14/1 water to gas. As a processing step, the use of the absorption column permits the recovery and transfer of desirable coffee flavor and aroma compounds to a concentrate obtained from concentration of extract from below 20% solids to 40% solids, preferably 50% solids or more prior to spray drying. These flavor and aroma volatiles can then be incorporated in the concentrated coffee extract and fixed in dry coffee solids by further processing using high viscosity spray drying of the concentrated extract. The aromas are recovered from the percolator columns during wetting (vent gas) from the extract discharged from the percolators to a scale tank, and from aromas recovered from a stripper employed just prior to extract concentration. Preferably, the volatile aromas include the noncondensible flavor and aroma compounds obtained from the percolation process and from stripping the resulting extract.

The invention is based on the finding that highly volatile coffee flavor and aroma compounds can be recovered in cold water and may be absorbed therein, provided proper absorption conditions are employed.

The absorption column is adapted to the selective removal of flavor notes so that some 50%, preferably 75 to 90% of the light coffee aroma components obtained from the extract stripping process are recovered by the absorption column.

In addition, the evaporator is operated to suppress the recovery of Furfural to less than 60% of that available in the extract being concentrated by recovering as aroma from the stripper only the first 20%, or preferably less than 12% of the extract fed to the stripper.

The aroma is refined and absorbed and is now incorporated into the concentrated extract of 50% solids or greater and spray dridd.

We have also found it advantageous to employ roasted and ground coffee containing sufficient light aroma to generate total purge and trap gas chromatograph count above 2500 ug/gm or "Lights" of 1,000 ug/gm or greater in the scale tank extract. One means of obtaining the minimum gas chromatograph count is to use 30%, preferably 40% arabica coffee to generate a base extract which contains winey, buttery flavors that blend well with the "green" aroma recovered by stripping.

This invention involves the use of relatively low-cost equipment, whereas previous equipment for gaseous aroma collectors were high-cost items such as liquid nitrogen condensers or brine-cooled wiped film vapor-liquid contractors such as a Votator. A further advantage of this invention is its multiplicity of uses in processes where it is desirable to capture non-condensable gaseous flavor and aroma compounds for retention in the finished product.

DISCLOSURE OF THE INVENTION

A process for the preparation of soluble coffee by spray drying a concentrated aqueous coffee extract obtained from roasted and ground coffee has now been discovered in which light, non-condensible coffee aromas are captured and fixed in the final dry coffee by employing the following steps:

(a) obtaining coffee extract from roasted and ground coffee by drawing off an extract from the fresh column characterized as having a minimum total gas chromatograph count of 2500 ug per gram (1000 ug "lights" per gram) of coffee solids by the purge and trap method;

(b) collecting the extract in a scale tank;

(c) collecting light aromas from the tank using a vacuum pump having a water sea to condense and collect the aromas in the seal water;

(d) stripping the extract from the scale tank with steam and collecting condensible aroma by using a cold condenser and by collecting part of the non-condensible in the vacuum pump of step (c);

(e) evaporating at subatmospheric conditions said stripped aqueous coffee extract to a concentration in excess of about 40%, preferably 50%, more preferably 55% by weight solids;

(f) introducing the seal water from step (c) and the condensed stripper aroma from step (d) to a cold water absorber having from 4-48 stages or plates and a L/V ratio of 0.1/1 to 1/30;

(g) recycling a portion of the absorbate to the water seal of the vacuum pump of step (c);

(h) combining the absorbate from step (f) with the portion of concentrated extract of step (e); and (i) spray drying the combined strippings and extracts of step (h).

The evaporative concentration of step (e) may be carried out in a single effect or a multiple effect vacuum evaporator or other suitable concentration equipment including scraped film evaporators.

The solids concentration of the combined strippings and extracts of step (h) fed to the spray dryer is about 35% to 60%, preferably 50% to 60% solids.

BRIEF DESCRIPTION OF THE DRAWING FIGURES

The figures in the drawings are briefly described as follows:

FIG. 1 shows a flow sheet of the process of the invention.

Figure 2:
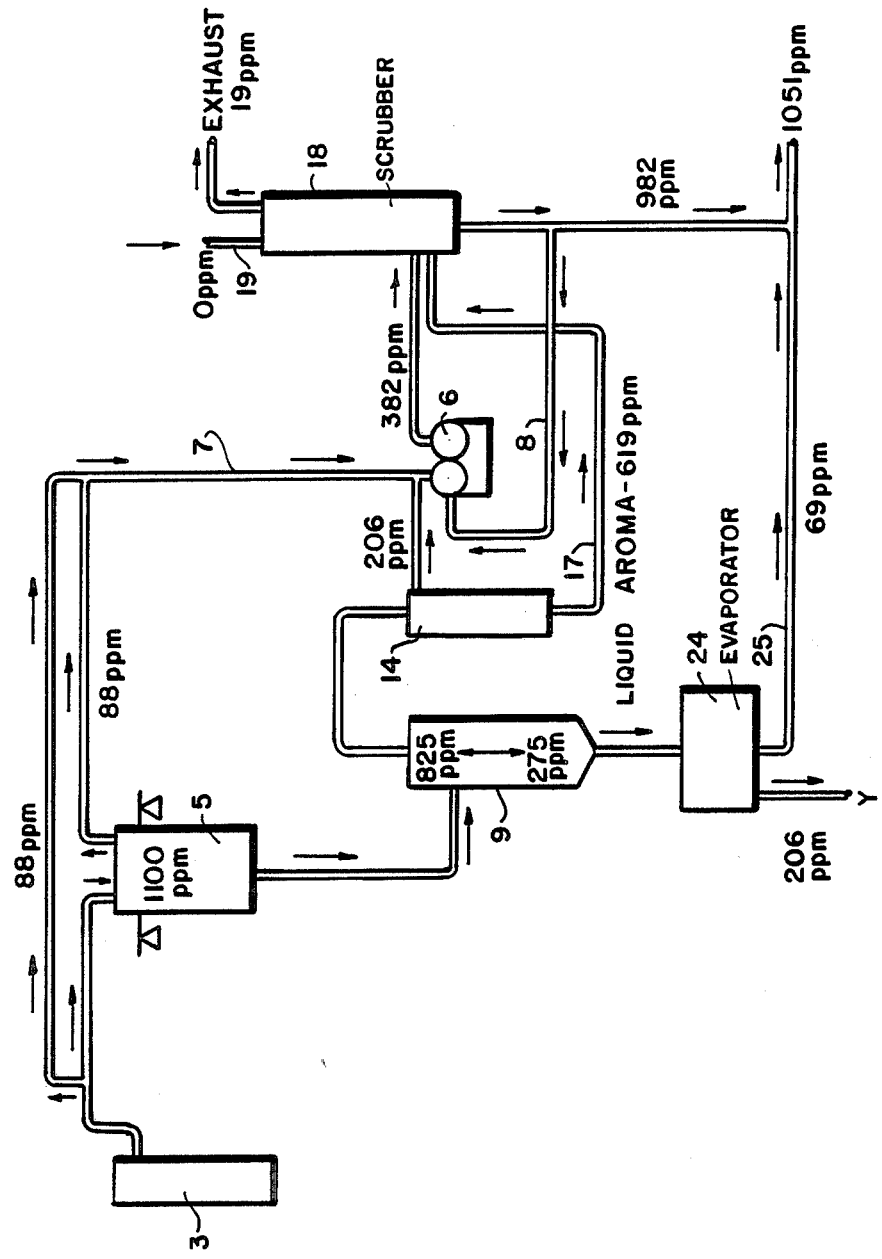

FIG. 2 sets forth the material balance of the process of the invention.

BEST MODE FOR CARRYING OUT THE INVENTION

This invention involves the use of a stripping device to remove volatile aromas, cold water absorbing medium in a gas absorption column to trap the non-condensable aroma from stripping and other "Light" aromas and high viscosity spray drying to fix the "Lights" in the dry coffee.

The uncondensable vapor gases "Lights" are trapped in the water by using from 8-48 stages of structured packing in a column (such as Goodloe packing placed in a Glitsch column) and contacting the volatiles with a high ratio of 0.1/1 to 30/1 more preferably 4/1 or 8/1 to 24/1 of liquid to gaseous flow in the absorption column.

Referring now to FIG. 1 there is shown a flow sheet of the process of this invention. Hot feed water 1 at 185° C. is fed to a series of percolator columns, generally shown as 2, with the water introduced to the most spent coffee grounds countercurrent to the freshest coffee. After passing through two or more columns, the feed water containing autoclaved coffee solids is cooled using an intercolumn cooler 4 which lowers the extrcct temperature to below 100° C. The extract then moves to one or more columns filled with fresh coffee, generally designated as 3. Preferably, two or more fresh columns are employed to collect as much good quality aroma and coffee extract as possible. The figure shows three autoclave columns and three fresh or atmospheric columns. Extract from the last column is collected in a drawoff or scale tank, generally shown as 5. Volatile non-condensed gas (vent gas) from the air displaced as the atmospheric columns are filled as well as gasses leaving the extract in the scale tank (carbon dioxide head space gas), are removed through line 7 using a vacuum pump having a water seal, generally shown as 6. Water for the pump seal is taken through line 8 and is obtained from the chilled absorber water which contains collected aroma once steady state operation is reached. On start up, fresh water employed in the absorber is used.

Extract from the scale tank 5 is introduced to a stripper 9 through line 10 and atomized using nozzle 12. Steam 11 is introduced into the stripper below the atomized extract and the steam removes much of the aroma and some water to a chilled water condenser shown as 14 Non-condensible aromas from the stripper condenser 14 are sent to the vacuum pump 6 through line 15, while condensed liquid aroma 17 is introduced to the absorber or scrubber 18. Added water 19 is sprayed over structured packing 20 on start up and to make up for absorbate removed to tank 22, from the absorber which has 8 to 24 stages of Packing. The absorbate 21 containing the aroma is collected in tank 22 while some through line 8 is recycled to the vacuum Pump seal 6.

The stripped extract 23 from the stripper 9 is introduced into an evaporator 24 and the concentrated extract having solids content, preferably from 50-70% solids, 25 is mixed with aroma 26 and spray dried in 27.

FIG. 2 is a "Light" aroma content material balance showing parts per million (ppm) of aroma per gram of solids or ug/gm soluble solids basis as determined by capillary column gas bhrmmatographic analysis using purge and trap sample preparation as described herein. In general, these material balance numbers may vary from ±50%, more preferably ±25%, and preferably ±15%. As can be seen, some 88 ppm of vent gas, 88 ppm of Carbon dioxide head space aroma from the scale tank 5 and 206 ppm of non-condensable "Lights" from the stripper 9, are collected by the vacuum pump seal water 6 which is introduced into the scrubber or absorber 18 with the condensed aroma 17 obtained from the stripper condenser 14. The aromas are recovered in the absorber 18 using cold water running over from 8-24 stages of structured packing.

Vent gas is the gas pushed out of the fresh column as it is filled with extract and has a "Light" aroma level of some 5-15% of the total "Lights" in the extract.

Carbon dioxide head space aroma is dissolved in the extract and is released in the scale tank. It has an aroma level roughly equal to vent gas.

The extract stripper 9 is operated under a vacuum and consists of an open chamber where extract is atomized near the top using spray nozzles and falls through an atmosphere of steam which removes from up to 20%, preferably less than 12%, preferably 3 to 12% of the extract introduced in the stripper, as well as from 70-95% of the "Lights" present in the extract. About 60 to 70% of the weight or steam is removed in the stripper. The stripped aroma is then condensed in a water chilled condenser which removes some 99% of the water vapor but only 70 to 90% of the "Lights". The bulk of the remaining "Lights" are pulled by the vacuum pump and trapped in the pump water seal 6 of cold aromatized water drawn from the scrubber 18. Of course, the exact amount of vapor stripped from the extract will vary with the operating conditions.

The vacuum pump 6 used is a commercially available liquid ring vacuum pump which has been piped to collect non-condensible aroma in the water seal. It works by having water fed into the pump at a controlled rate, which is then picked up by an imPeller and thrown by centrifugal force to the periphery of the impeller housing. A cavity is created between blades that are completely immersed in the water in the housing and blades that only have water at their tips as they rotate, this forming the seal. The pump is designed so this cavity coincides with an inlet port on the endplate, and process air is induced into the pump.

By similar but reverse action, the air is forced out of an endplate port at the opposite end of the pump. As this process air is being transfered through the pump, a significant amount of mixing takes place, resulting in absorption of noncondensed aroma components.

The absorber or scrubber 18 is operated counter currently using cold water 0-°10° C., preferably 0-°5° C. The liquid to vapor ratio can (L/V) be from 0.1 to 1 to 30 to 1, preferably 4 to 1 to 24/1. The diameter of the scrubber is sized to provide a minimum pressure drop. The upper portion of the scrubber is packed with structured packing to give some 4-48 stages. Other commercial packing, which gives similar results without much greater pressure drop, would be suitable.

The condensed aroma from the stripper is added to the absorber or scrubber and aids recovery of aromas and maintenance of steady state equilibrium and batch integrity.

The advantage of using water in the scrubber is that cleaning is easier and there are no biological problems. The scrubber may be operated under pressures of up to 50 psig to improve efficiency.

The aroma from the absorber is stored in a cooled aroma tank 22 for addback to the concentrated extract recovered from the evaporator 24.

The stripped extract is evaporated in a multiple stage vacuum evaporator 24, such as is manufactured by the APV company. Extract at from 10–20% solids is concentrated to above 40%, preferably above 50% solids. The evaporator is operated as a three stage, three effect evaporator with boiling extract maintained at 70° C., 60° C. and 50° C. as controlled by the vacuum setting for each flash chamber. The first effect is heated by steam. The second and third effect are heated by vapor from the previous effect. The resulting condensate from each of the effects has some amount of aroma components which includes a significant amount of undesirable flavors. A large part of this is Furfural, which tends to be generated in unbalanced amounts in the soluble process. The results of stripping allows us to preserve the desirable components in more of a natural (R&G-like) balance. The condensate from the evaporator is sent to the drain.

Aroma from the aroma tank is mixed with the concentrated extract. Mixing is done continuously by the use of a commercial in-line static mixer. A metering pump is used to add the aroma back to the extract feed line at the inlet of the spray drier feed pump. The ratio is controlled based on the amount of solids being fed to the drier. Addback is usually at a 100% level, but there are times when the addback is reduced to less than 100%.

The aromatized extract is dried using high viscosity spray drying by spraying the extract at 55% solids using 2500 psi and spraying system nozzles which gives small particles into hot air. The extract, because of its small particle size dries quickly trapping a high percentage of the "light" aroma. The spray driers inlet temperature of 250° C. to 270° C. and outlet temperature of 105° C. to 120° C., preferably less 110° C., are also controlled to maintain 0.5 to 1.5% greater water content than normal dried extract, namely a final moisture content of 3% to 5%. This further prevents development of cooked, carmel flavors which are not desirable.

The final dry coffee may be agglomerated, flaked, blended with other coffee and otherwise treated to develop useful coffee products.

Purge and trap method of measuring coffee components is conducted by collecting the coffee volatiles from soluble coffee, coffee extract, coffee brews or aroma in aqueous solution. This is done by sweeping the volatiles with an inert gas using an external Dynamic Thermal Stripper, Model 1260 multi-layered adsorbent trap.

The trap is termally desorbed into a Unicon 810A Concentrator by Envirochem Inc., which introduces the volatiles as a small sample plug into a Perkin Elmer Sigma 1 gas chromotograph equipped with FID or equivalent.

Samples are prepared at about 1% by weight coffee solids in a 100 ml volumetric flask. The contents of the flask are sparged with Helium at 60 ml/min. in an oven controlled at 65° C. Dynamic Thermal Stripper where the volatiles are collected in a Sorbent Tube Model ST031. The tube that is used to collect the volatiles, contains glass beads/Tenax TA/Ambersorb/Charcoal. Two ml of 0.1 4-mehylthiazole in 3 ml of water is used as an external standard.

The volatiles collected by the collection tubes are transferred at 230° C. to the Unicon Concentrator where they are concentrated and introduced to the chromatographic column (25 m×0.32 mm) fused silica WCOT capillary coated with CP Si15, nominal lumfilm thicnness from Chrompack or Scientific Inc. The detector temperature is 250° C. and the injector temperature 230° C. The oven temperature is 0° C. for 6 minutes, then programed to 200° C. at 6° C./min, and held at 200° C. for 5 minutes.

The analysis is reported as follows:

| Sample Description | Scale Tank Extract |
| --- | --- |
| Total FID | 4280 |
| Acetaldehyde | 935 |
| IBA | 400 |
| IVA | 327 |
| 2 Me Butanol | 284 |
| Furan | 17 |
| 2 Me Furan | 0 |
| Diacetyl | 67 |
| 2,3 Pent-D | 68 |
| Furfural | 1148 |
| Lights (all but furfural) | 2098 |

The total Flame Ionization Detectors (FID) counts are 4,280 which include Furfural, "Lights" and higher molecular weight compounds. The lights are the total count for Acetaldehyde, Isobutyl Acetaldehyde (IBA) Isovaleryl Aldehyde (IVA), 2-Methyl Butanol, Furan, 2-Methyl Furan, Diacetyl, 2, 3 Pentandione.

The spray-dried products produced in accordance with this invention have been described as being similar to freeze-dried coffee. Their flavor is characterized as winey, buttery, aromatic, groundsy, smooth and well rounded.

EXAMPLE

A blend of 100% arabica beans are roasted to a 55 roast color, ground coarsely and fed into a percolation process to produce a coffee extract of approximately 15% concentration. Each column is filled with apprxximately 660 kg of fresh R&G at a density of 300 kg/cu. meter.

As the fresh column of coffee is being filled with extract from the next to fresh column, the displaced gas is drawn through vent lines to the aroma recovery system. The volume of this gas is equal to approximately 66% of the volume of the percolator column, or in this case, 1.45 cu. meters.

After the column is full, the coffee extract is drawn off into a sealed scale tank. The extract is cooled to less than 35° C. as it is drawn off. As the extract enters the tank, it releases disolved gases which are also drawn through a vent line to the aroma recovery system. The total weight of extract drawn off into the scale tank per cycle is 1980 kg. (DOF 3.0). Each cycle is completed in approximately 35 minutes.

Both vent gases include "Light aromas" produced in the roasting process and released by wetting and extracting the R&G coffee in the percolation system.

The extract is then sent to the stripper. It is fed to the stripper at 8000 kg/hr. Low pressure steam is fed into the stripper at a rate of approximately 225 kg/hr. A slight vacuum is pulled on the stripper and the result is 320 kg/hr of aroma laden vapor being sent to the condenser.

As this 4% strip is being made, approximately 75% of the target "Light" compounds are stripped from the extract. Of these, approximately 75% are condensed with the vapor and 25% exit the condenser through the vacuum pump.

The extract is evaporated to approximately 60% concentration in a triple effect APV evaporator.

The noncondensed gases from the stripper condenser, as well as the vent gases from theppercolator column and scale tank, are fed into the scrubbing column. Fresh, chilled water (5° C.) is fed into the top of the column at 80 kg/hr. As the water and gas pass countercurrently through the column, 90–95% of the ligtt aroma components are absorbed into the liquid stream.

The condensed stripped aroma from the previous stripping process is also fed into the scrubbing column below the packing. This results in uniform mixing of the two aroma streams and acts as a buffer for the seal water. As the aroma product exits the scrubber, it is chilled to 5° C. A part of the product stream is diverted to the vacuum pump as seal water and recycled to the scrubber.

The aroma product is stored in a jacketed tank and fed back into the extract feed to the spray drier using a metering pump. The liquid aroma is fed back at a level equal to 100%, based on solids being fed to the spray drier. In this example, for every 3 kg of soluble solids being fed to the spray drier, 1 kg of liquid aroma is added back.

The aromatized extract is dried in a spray drier at an inlet temperature of 260° C. and outlet temperature below 110° C. to obtain a dry aromatized powder.

We claim:

1. A process for preparing aromatized dried coffee extract comprising:
    (a) drawing off extract from fresh roasted and ground coffee to obtain coffee extract having a minimum gas chromatograph count of 2500 ug/g soluble coffee solids;
    (b) collecting light aromas from said extract in a vacuum pump using a cold water seal to condense and collect aromas in the water seal;
    (c) stripping the extract of step (a) with steam and collecting up to 20% condensible aroma by using a cold condenser and also collecting the non-condensibles of the stripping operation in the vacuum pump of step (b);
    (d) Evaporating at subatmospheric conditions the stripped extract of step (c) to a solids content of at least 40% solids;
    (e) introducing the seal water aroma of step (b) and the condensed aroma of step (c) to an absorber having 4 to 48 plates and contacting the aromas with cold water under 10° C. at a liquid to gas ratio of 0.1 to 1 to 30 to 1, the gas comprising the seal water aroma of step (b);
    (f) combining the absorbate aroma of step (e) with the concentrated extract of step (d) and
    (g) spray drying the concentrate of (f), to a dry aromatized soluble coffee.

2. The process of claim 1 wherein the extract in step (a) is prepared from roasted and ground coffee containing at least 30% arabica coffee to generate distinct winey, buttery flavor notes in the final spray-dried product.

* * * * *